United States Patent
Nishino et al.

(10) Patent No.: US 12,225,907 B2
(45) Date of Patent: Feb. 18, 2025

(54) AGRICULTURAL AND HORTICULTURAL COMPOSITION

(71) Applicant: Nippon Soda Co., Ltd., Tokyo (JP)

(72) Inventors: Shigeki Nishino, Shizuoka (JP);
Humberto Mitio Horikoshi, Shizuoka (JP); Yusuke Fukushima, Shizuoka (JP); Chang-Kyung Kang, Fukushima (JP); Shigeo Yamada, Shizuoka (JP)

(73) Assignee: Nippon Soda Co., Ltd., Chiyoda-ku (JP)

( * ) Notice: Subject to any disclaimer, the term of this patent is extended or adjusted under 35 U.S.C. 154(b) by 185 days.

(21) Appl. No.: 17/793,523

(22) PCT Filed: Jan. 29, 2021

(86) PCT No.: PCT/JP2021/003295
§ 371 (c)(1),
(2) Date: Jul. 18, 2022

(87) PCT Pub. No.: WO2021/153748
PCT Pub. Date: Aug. 5, 2021

(65) Prior Publication Data
US 2023/0123818 A1    Apr. 20, 2023

(30) Foreign Application Priority Data
Jan. 29, 2020   (JP) ................ 2020-012654

(51) Int. Cl.
| | |
|---|---|
| *A01N 59/26* | (2006.01) |
| *A01N 47/18* | (2006.01) |
| *A01P 3/00* | (2006.01) |
| *A01P 21/00* | (2006.01) |

(52) U.S. Cl.
CPC ............. *A01N 59/26* (2013.01); *A01N 47/18* (2013.01); *A01P 3/00* (2021.08); *A01P 21/00* (2021.08)

(58) Field of Classification Search
None
See application file for complete search history.

(56) References Cited

U.S. PATENT DOCUMENTS

| | | |
|---|---|---|
| 4,849,219 A | 7/1989 | Staub et al. |
| 5,656,281 A | 8/1997 | Hytte et al. |
| 2006/0283223 A1* | 12/2006 | Grech .......... A01N 47/26 71/31 |
| 2011/0287108 A1 | 11/2011 | Coqueron et al. |
| 2012/0027741 A1 | 2/2012 | Coqueron et al. |
| 2013/0005672 A1 | 1/2013 | Urihara |

FOREIGN PATENT DOCUMENTS

| | | | |
|---|---|---|---|
| CN | 1035416 A | * | 9/1989 |
| CN | 106922709 A | | 7/2017 |
| CN | 106993628 A | | 8/2017 |
| JP | 62-148412 A | | 7/1987 |
| JP | 03-255001 A | | 11/1991 |
| JP | 2008-542170 A | | 11/2008 |
| JP | 2012-510446 A | | 5/2012 |
| JP | 2012-518028 A | | 8/2012 |
| WO | WO-2011/115029 A1 | | 9/2011 |
| WO | WO-2018162999 A1 * | 9/2018 | ............. A01N 37/24 |

* cited by examiner

*Primary Examiner* — Alton N Pryor
(74) *Attorney, Agent, or Firm* — Millen White Zelano & Branigan; Csaba Henter

(57) ABSTRACT

An object of the present invention is to provide an agricultural and horticultural composition excellent in the effect of controlling plant disease or accelerating plant growth and a method for controlling plant disease or accelerating plant growth. The agricultural and horticultural composition of the present invention contains t-butyl (6-{[(Z)-(1-methyl-1H-5-tetrazolyl)(phenyl)methylene]aminooxymethyl}-2-pyridyl)carbamate and a phosphite salt. A method for controlling plant disease or accelerating plant growth of the present invention comprises simultaneously or successively applying t-butyl (6-{[(Z)-(1-methyl-1H-5-tetrazolyl)(phenyl)methylene]aminooxymethyl}-2-pyridyl)carbamate and a phosphite salt such as potassium phosphite, ammonium phosphite, calcium phosphite, aluminum phosphite, or sodium phosphite to a plant, soil, or hydroponic plowland.

16 Claims, No Drawings

AGRICULTURAL AND HORTICULTURAL COMPOSITION

TECHNICAL FIELD

The present invention relates to an agricultural and horticultural composition excellent in the effect of controlling plant disease or accelerating plant growth and a method for controlling plant disease or accelerating plant growth.

CROSS-REFERENCE TO RELATED APPLICATIONS

The present application is the U.S. National Stage of PCT/JP2021/003295, filed Jan. 29, 2021, which claims the priority to Japanese Patent Application No. 2020-12654, filed on Jan. 29, 2020, and the contents thereof is incorporated herein.

BACKGROUND ART

Various tetrazolyloxime derivatives are known which are said to exhibit an effect on disease control of agricultural and horticultural crops. Agricultural and horticultural compositions containing tetrazolyloxime derivatives for protecting plants, crops, or seeds from fungal disease or insect damage are also known.

For example, Patent Document 1 discloses a pesticide composition containing 0.125 ppm a.i. but-3-yn-1-yl{6-[({[(Z)-(1-methyl-1H-tetrazol-5-yl)(phenyl)methylene]amino}oxy)methyl]pyridin-2-yl}carbamate and 12.5 ppm a.i. phosphorous acid.

Patent Document 2 discloses a pesticide composition containing 0.25 ppm a.i. N-hexyl-6-[({[(1-methyl-1H-tetrazol-5-yl)(phenyl)methylene]amino}oxy)methyl]pyridin-2-amine and 12.5 ppm a.i. phosphorous acid.

Patent Document 3 discloses the effect of the mixing and blending of 0.4 to 1.0 mg/L picarbutrazox and 14 to 25 mg/L phosphorous acid on cucumber downy mildew.

PRIOR ART DOCUMENTS

Patent Documents

Patent Document 1: Japanese unexamined Patent Application Publication (Translation of PCT Application) No. 2012-518028 (WO 2010/094728 A)
Patent document 2: Japanese unexamined Patent Application Publication (Translation of PCT Application) No. 2012-510446 (WO 2010/060982 A)
Patent Document 3: CN 106993628 A

SUMMARY OF THE INVENTION

Object to be Solved by the Invention

An object of the present invention is to provide an agricultural and horticultural composition excellent in the effect of controlling plant disease or accelerating plant growth and a method for controlling plant disease or accelerating plant growth.

Means to Solve the Object

The present inventors have examined to achieve the above-mentioned object and consequently completed the present invention including the following aspects.

[1] An agricultural and horticultural composition, comprising: t-butyl (6-{[(Z)-(1-methyl-1H-5-tetrazolyl)(phenyl)methylene]aminooxymethyl}-2-pyridyl)carbamate; and a phosphite salt.
[2] The agricultural and horticultural composition according to [1], wherein the phosphite salt is at least one selected from the group consisting of potassium phosphite, ammonium phosphite, calcium phosphite, aluminum phosphite, and sodium phosphite.
[3] The agricultural and horticultural composition according to [1] or [2], wherein a mass ratio of the phosphite salt to t-butyl (6-{[(Z)-(1-methyl-1H-5-tetrazolyl)(phenyl)methylene]aminooxymethyl}-2-pyridyl)carbamate is 1/1000 to 1000/1 in terms of $P_2O_5$.
[4] The agricultural and horticultural composition according to any one of [1] to [3], wherein a content of the phosphite salt is 0.1 to 70% by mass in terms of $P_2O_5$.
[5] The agricultural and horticultural composition according to any one of [1] to [4], wherein the agricultural and horticultural composition is for controlling plant disease or for accelerating plant growth.
[6] The agricultural and horticultural composition according to any one of [1] to [5], further comprising at least one selected from the group consisting of a fungicide, an insecticide, a miticide, a nematicide, a soil pesticide, an insect repellent, a herbicide, a plant growth regulator, and a fertilizer.
[7] The agricultural and horticultural composition according to any one of [1] to [6], further comprising a nitrogen component.
[8] The agricultural and horticultural composition according to any one of [1] to [7], further comprising a potassium component.
[9] The agricultural and horticultural composition according to any one of [1] to [8], further comprising a component containing an element selected from the group consisting of boron, molybdenum, sulfur, and manganese.
[10] A method for controlling plant disease or accelerating plant growth, comprising simultaneously or successively applying t-butyl (6-{[(Z)-(1-methyl-1H-5-tetrazolyl)(phenyl)methylene]aminooxymethyl}-2-pyridyl)carbamate and a phosphite salt to a plant, soil, or hydroponic plowland.
[11] The method according to [10], wherein the phosphite salt is at least one selected from the group consisting of potassium phosphite, ammonium phosphite, calcium phosphite, aluminum phosphite, and sodium phosphite.
[12] A method for controlling plant disease or accelerating plant growth, comprising applying the agricultural and horticultural composition according to any one of [1] to [9] to a plant, soil, or hydroponic plowland.

Effect of the Invention

An agricultural and horticultural composition and a method of the present invention exhibit an excellent control effect on plant diseases including those caused by not only true fungi but also bacteria, or exhibit the effect of accelerating plant phylactic ability and plant growth. Furthermore, the agricultural and horticultural composition and the method of the present invention may not do chemical injury to useful plants.

The plant growth acceleration effect means accelerating the growth of any tissue of plants such as plant body rooting acceleration, lodging prevention, yield improvement, cold resistance improvement, green improvement, increase in the number of tillers (branches), and organ growth acceleration or accelerating the raising of vigorous seedlings. This effect improves yield.

MODE OF CARRYING OUT THE INVENTION

An agricultural and horticultural composition of the present invention contains a tetrazolyloxime component and a phosphite salt.

The tetrazolyloxime component to be used for the present invention is t-butyl (6-{[(Z)-(1-methyl-1H-5-tetrazolyl)(phenyl)methylene]aminooxymethyl}-2-pyridyl)carbamate. This compound has a structure of formula (a). This compound is a known substance as described in WO 2003/016303 A, and the like.

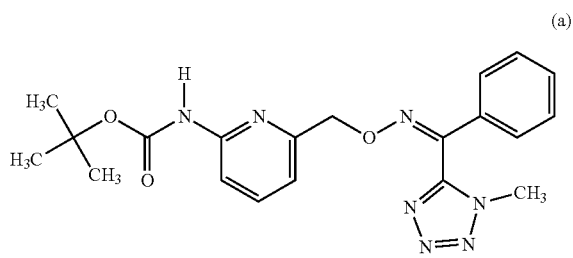 [SMILES: Cn1nnnc1/C(=N\OCc1cccc(NC(=O)OC(C)(C)C)n1)c1ccccc1]

(a)

As the phosphite salt to be used for the present invention, ammonium phosphite, potassium phosphite, sodium phosphite, calcium phosphite, copper phosphite, zinc phosphite, magnesium phosphite, aluminum phosphite, or the like are exemplified. Among these, potassium phosphite, ammonium phosphite, calcium phosphite, aluminum phosphite, or sodium phosphite is preferable, and potassium phosphite is more preferable from the viewpoint of plant growth acceleration and disease control. As potassium phosphite, potassium dihydrogen phosphite, dipotassium hydrogen phosphite, tripotassium phosphite, or the like may be exemplified. When a phosphite salt is prepared into an aqueous solution for use, the pH is adjusted to preferably 3 or more, more preferably 5 or more, further preferably 6 or more.

In the agricultural and horticultural composition of the present invention, the content of the phosphite salt is preferably 0.1 to 70% by mass, more preferably 1 to 50% by mass, and further preferably 5 to 35% by mass in terms of $P_2O_5$.

In the agricultural and horticultural composition of the present invention, the mass ratio of the tetrazolyloxime component to the phosphite salt (in terms of $P_2O_5$) is preferably 1/1000 to 1000/1, more preferably 1/100 to 100/1, further preferably 1/1 to 1/100, and the most preferably 1/5 to 1/50.

In the agricultural and horticultural composition of the present invention, the total content (active ingredient content) of the tetrazolyloxime component and the phosphite salt may be suitably set up depending on the dosage form. For example, the total content is preferably 5 to 90% by mass and more preferably 10 to 85% by mass in wettable powder; preferably 3 to 70% by mass and more preferably 5 to 60% by mass in an emulsion; and preferably 0.01 to 50% by mass and more preferably 0.05 to 40% by mass in granules.

The agricultural and horticultural composition of the present invention may further contain a nitrogen component or/and a potassium component in addition to the tetrazolyloxime component and the phosphite salt. A nitrogen component, a potassium component, and a phosphoric acid component are three major elements required for plants to grow.

Although potassium phosphite or ammonium phosphite is also a potassium component or a nitrogen component, these are treated as phosphite salts in the present invention.

As the nitrogen component, ammonium chloride, ammonium sulfate, ammonium nitrate, ammonium dihydrogen phosphate (ammonium dihydrogen phosphate is also a phosphoric acid component.), urea, nitrolime, potassium nitrate (potassium nitrate is also a potassium component.), or the like may be exemplified.

As the potassium component, potassium chloride, potassium sulfate, potassium carbonate, potassium silicate, or the like may be mentioned.

As the phosphoric acid component, calcium superphosphate (a mixture of calcium dihydrogen phosphate and calcium sulfate), triple superphosphate (calcium dihydrogen phosphate), potassium dihydrogen phosphate (potassium dihydrogen phosphate is also a potassium component.), a fused phosphate fertilizer, or the like may be exemplified.

The agricultural and horticultural composition of the present invention may further contain a component containing an element selected from the group consisting of boron, molybdenum, sulfur, and manganese. Boron can be present as boric acid or the like. Molybdenum can be present as anions such as molybdate. Sulfur can be present as ammonium sulfate or the like. Manganese can be present as cations in salts such as chlorides, nitrates, and sulfates.

The agricultural and horticultural composition of the present invention may further contain other components in addition to the above-mentioned components. As the other components, a fungicide, an insecticide, a miticide, a nematicide, a soil pesticide, insect repellent, a herbicide, a plant growth regulator, a fertilizer, or the like may be exemplified.

Examples of the fungicide that may be mixed with the agricultural and horticultural composition of the present invention for use or used in combination with the agricultural and horticultural composition will be shown below.

(1) Nucleic acid biosynthetic inhibitor:
(a) RNA polymerase I inhibitor: benalaxyl, benalaxyl-M, furalaxyl, metalaxyl, metalaxyl-M, oxadixyl, clozylacon, and ofurace;
(b) Adenosine deaminase inhibitor: bupirimate, dimethirimol, and ethirimol;
(c) DNA/RNA synthesis inhibitor: hymexazol and octhilinone; and
(d) DNA topoisomerase II inhibitor: oxolinic acid.

(2) Mitosis inhibitor and cell division inhibitor:
(a) β-tubulin polymerization inhibitor: benomyl, carbendazim, chlorfenazole, fuberidazole, thiabendazole, thiophanate, thiophanate-methyl, diethofencarb, zoxamide, and ethaboxam;
(b) Cell division inhibitor: pencycuron; and
(c) Spectrin-like protein delocalization inhibitor: fluopicolide.

(3) Respiration inhibitor:
(a) Complex I NADH oxidoreductase inhibitor: diflumetorim and tolfenpyrad;
(b) Complex II succinate dehydrogenase inhibitor: benodanil, flutolanil, mepronil, isofetamid, fluopyram, fenfuram, furmecyclox, carboxin, oxycarboxin, thifluzamide, benzovindiflupyr, bixafen, fluxapyroxad, furametpyr, isopyrazam, penflufen, penthiopyrad, sedaxane, boscalid, pyraziflumid, pydiflumetofen, isoflucypram, and inpyrfluxam;

(c) Complex III ubiquinol oxidase Qo inhibitor: azoxystrobin, coumoxystrobin, coumethoxystrobin, enoxastrobin, flufenoxystrobin, picoxystrobin, pyraoxystrobin, pyraclostrobin, pyrametostrobin, triclopyricarb, kresoxim-methyl, trifloxystrobin, dimoxystrobin, fenaminstrobin, metominostrobin, orysastrobin, famoxadone, fluoxastrobin, fenamidone, pyribencarb, mandestrobin, and metyltetraprole;
(d) Complex III ubiquinol reductase Qi inhibitor: cyazofamid, amisulbrom, and fenpicoxamid;
(e) Uncoupler of oxidative phosphorylation: binapacryl, meptyldinocap, dinocap, fluazinam, and ferimzone;
(f) Oxidative phosphorylation inhibitor (ATP synthetase inhibitor): fentin acetate, fentin chloride, and fentin hydroxide;
(g) ATP production inhibitor: silthiofam; and
(h) Complex III: Qx (unknown) inhibitor of citchrome bcl (ubiquinone reductase): ametoctradin.

(4) Amino acid and protein synthesis inhibitor
(a) Methionine biosynthesis inhibitor: andoprim, cyprodinil, mepanipyrim, and pyrimethanil;
(b) Protein synthesis inhibitor: blasticidin-S, kasugamycin, kasugamycin hydrochloride, streptomycin, and oxytetracycline.

(5) Signal transduction inhibitor:
(a) Signal transduction inhibitor: quinoxyfen and proquinazid;
(b) MAP and histidine kinase inhibitor in osmotic pressure signal transduction: fenpiclonil, fludioxonil, chlozolinate, iprodione, procymidone, and vinclozolin.

(6) Lipid and cell membrane synthesis inhibitor:
(a) phospholipid biosynthesis, methyl transferase inhibitor: edifenphos, iprobenfos, pyrazophos, and isoprothiolane;
(b) Peroxide agent of lipid: biphenyl, chloroneb, dichloran, quintozene, tecnazene, tolclofos-methyl, and etridiazole;
(c) Agent that acts on cell membrane: iodocarb, propamocarb, propamocarb-hydrochloride, propamocarb-fosetylate, and prothiocarb;
(d) Microorganism that disrupts cell membrane of pathogenic microorganism: *Bacillus subtilis, Bacillus subtilis* strain QST713, *Bacillus subtilis* strain FZB24, *Bacillus subtilis* strain MBI600, *Bacillus subtilis* strain D747, and *Bacillus amyloliquefaciens;*
(e) Agent that disrupts cell membrane: *Melaleuca alternifolia* (tea tree) extract).

(7) Cell membrane sterol biosynthesis inhibitor:
(a) C14 position demethylation inhibitor in sterol biosynthesis: triforine, pyrifenox, pyrisoxazole, fenarimol, flurprimidol, nuarimol, imazalil, imazalil-sulfate, oxpoconazole fumarate, pefurazoate, prochloraz, triflumizole, viniconazole, azaconazole, bitertanol, bromuconazole, cyproconazole, diclobutrazol, difenoconazole, diniconazole, diniconazole-M, epoxiconazole, etaconazole, fenbuconazole, fluquinconazole, flusilazole, flutriafol, furconazole, furconazole-cis, hexaconazole, imibenconazole, ipconazole, metconazole, myclobutanil, penconazole, propiconazole, fluquinconazole, simeconazole, tebuconazole, tetraconazole, triadimefon, triadimenol, triticonazole, prothioconazole, voriconazole, and mefentrifluconazole;
(b) Δ14 reductase and Δ8→Δ7-isomerase inhibitor in sterol biosynthesis: aldimorph, dodemorph, dodemorph acetate, fenpropimorph, tridemorph, fenpropidin, piperalin, and spiroxamine;
(c) 3-ketoreductase inhibitor in C4 position demethylation of sterol biosynthesis system: fenhexamid and fenpyrazamine; and
(d) Squalene epoxidase inhibitor in sterol biosynthesis system: pyributicarb, naftifine, and terbinafine.

(8) Cell wall synthesis inhibitor
(a) Trehalase inhibitor: validamycin;
(b) Chitin synthetase inhibitor: polyoxins and polyoxorim; and
(c) Cellulose synthase inhibitor: dimethomorph, flumorph, pyrimorph, benthiavalicarb-isopropyl, iprovalicarb, valifenalate, and mandipropamid.

(9) Melanin biosynthesis inhibitor
(a) Reductase inhibitor in melanin biosynthesis: fthalide, pyroquilon, and tricyclazole;
(b) Dehydratase inhibitor in melanin biosynthesis: carpropamid, diclocymet, and fenoxanil; and
(c) polyketide synthesis inhibitor in melanin biosynthesis: tolprocarb.

(10) Host plant resistance inducer:
(a) Agent that acts on salicylic acid synthetic pathway: acibenzolar-S-methyl; and
(b) Others: probenazole, tiadinil, isotianil, dichlobentiazox, laminarin, and *Reynoutria sachalinensis* extract.

(11) Agent having unknown activity: cymoxanil, fosetyl-aluminium, phosphoric acid (phosphate), tecloftalam, triazoxide, flusulfamide, diclomezine, methasulfocarb, cyflufenamid, metrafenone, pyriofenone, dodine, dodine free base, and flutianil.

(12) Agent having multiple sites of action: copper (copper salt), Bordeaux mixture, copper hydroxide, copper naphthalate, copper oxide, copper oxychloride, copper sulfate, sulfur, sulfur product, calcium polysulfide, ferbam, mancozeb, maneb, mancopper, metiram, polycarbamate, propineb, thiram, zineb, ziram, captan, captafol, folpet, chlorothalonil, dichlofluanid, tolylfluanid, guazatine, iminoctadine triacetate, iminoctadine trialbesilate, anilazine, dithianon, quinomethionate, and fluoroimide.

(13) Other agents: DBEDC, fluorofolpet, guazatine acetate, bis(8-quinolinolato)copper(II), propamidine, chloropicrin, cyprofuram, *Agrobacterium*, bethoxazin, diphenylamine, methyl isothiocyanate (MITC), mildiomycin, capsaicin, cufraneb, cyprosulfamide, dazomet, debacarb, dichlorophen, flumetover, fosetyl-calcium, fosetyl-sodium, irumamycin, natamycin, nitrothal-isopropyl, oxamocarb, pyrrolnitrin, tebufloquin, tolnifanide, zarilamide, algophase, amicarthiazol, oxathiapiprolin, metiram-zinc, benthiazole, trichlamide, uniconazole, oxyfenthiin, dichlobentiazox, quinofumelin, thiuram, ambam, *Agrobacterium radiobacter, Coniothyrium minitans, Pseudomonas fluorescens, Pseudomonas rhodesiae, Talaromyces flavus, Trichoderma atroviride*, avirulent *Erwinia carotovora* (*Erwinia carotovora* subsp. *carotovora*), *Bacillus simplex, Variovorax paradoxus, Lactobacillus plantarum*, florylpicoxamid, pyrapropoyne, fluindapyr, aminopyrifen, pyridachlometyl, and ipflufenoquin.

Specific examples of the insecticide, the miticide, the nematicide, the soil pesticide, the insect repellent, and the like that can be mixed with the agricultural and horticultural composition of the present invention for use or used in combination with the agricultural and horticultural composition will be shown below.

(1) Acetylcholine esterase inhibitor:
  (a) Carbamate-based acetylcholine esterase inhibitor: alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, oxamyl, pirimicarb, propoxur, thiodicarb, thiofanox, triazamate, trimethacarb, XMC, xylylcarb, fenothiocarb, MIPC, MPMC, MTMC, aldoxycarb, allyxycarb, aminocarb, bufencarb, cloethocarb, metam-sodium, and promecarb;
  (b) Organophosphorus-based acetylcholine esterase inhibitor: acephate, azamethiphos, azinphos-ethyl, azinphos-methyl, cadusafos, chlorethoxyfos, chlorfenvinphos, chlormephos, chlorpyrifos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isocarbophos, isoxathion, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon, vamidothion, bromophos-ethyl, BRP, carbophenothion, cyanofenphos, CYAP, demeton-S-methyl sulfone, dialifos, dichlofenthion, dioxabenzofos, etrimfos, fensulfothion, flupyrazofos, fonofos, formothion, fosmethilan, isazofos, jodfenphos, methacrifos, pirimiphos-ethyl, phosphocarb, propaphos, prothoate, and sulprofos.

(2) GABAergic chloride ion channel antagonist: acetoprole, chlordane, endosulfan, ethiprole, fipronil, pyrafluprole, pyriprole, camphechlor, heptachlor, and dienochlor.

(3) Sodium channel modulator: acrinathrin, d-cis-trans allethrin, d-trans allethrin, bifenthrin, bioallethrin, bioallethrin s-cyclopentyl isomer, bioresmethrin, cycloprothrin, cyfluthrin, beta-cyfluthrin (β-cyfluthrin), cyhalothrin, lambda-cyhalothrin (λ-cyhalothrin), gamma-cyhalothrin (γ-cyhalothrin), cypermethrin, alpha-cypermethrin (α-cypermethrin), beta-cypermethrin (β-cypermethrin), theta-cypermethrin (θ-cypermethrin), zeta-cypermethrin (ζ-cypermethrin), cyphenothrin[(1R)-trans isomer], deltamethrin, empenthrin [(EZ)-(1R)-isomer]), esfenvalerate, etofenprox, fenpropathrin, fenvalerate, flucythrinate, flumethrin, τ-fluvalinate, halfenprox, imiprothrin, kadethrin, permethrin, phenothrin[(1R)-trans isomer], prallethrin, pyrethrum, resmethrin, silafluofen, tefluthrin, tetramethrin[(1R)-isomer], tralomethrin, transfluthrin, allethrin, pyrethrins, pyrethrin I, pyrethrin II, profluthrin, dimefluthrin, bioethanomethrin, biopermethrin, transpermethrin, fenfluthrin, fenpirithrin, flubrocythrinate, flufenprox, metofluthrin, protrifenbute, pyresmethrin, and terallethrin.

(4) Nicotinic acetylcholine receptor agonist: acetamiprid, clothianidin, dinotefuran, imidacloprid, nitenpyram, nithiazine, thiacloprid, thiamethoxam, sulfoxaflor, nicotine, flupyradifurone, and flupyrimine.

(5) Nicotinic acetylcholine receptor allosteric modulator: spinetoram and spinosad.

(6) Chloride channel activator: abamectin, emamectin-benzoate, lepimectin, milbemectin, ivermectin, selamectin, doramectin, eprinomectin, moxidectin, milbemycin, milbemycin oxime, and nemadectin.

(7) Juvenile hormone-like substance: hydroprene, kinoprene, methoprene, fenoxycarb, pyriproxyfen, diofenolan, epofenonane, and triprene.

(8) Other nonspecific inhibitors: methyl bromide, chloropicrin, sulfuryl fluoride, borax, and tartar emetic.

(9) Homoptera selective ingestion inhibitor: flonicamid, pymetrozine, and pyrifluquinazon.

(10) Mite growth inhibitor: clofentezine, diflovidazin, hexythiazox, and etoxazole.

(11) Microorganism-derived insect midgut lining membrane destructive agent: *Bacillus thuringiensis* subsp. *israelensis, Bacillus sphaericus, Bacillus thuringiensis* subsp. *aizawai, Bacillus thuringiensis* subsp. *kurstaki, Bacillus thuringiensis* subsp. *tenebrionis*, and Bt crop proteins: Cry1Ab, Cry1Ac, Cry1Fa, Cry1A.105, Cry2Ab, Vip3A, mCry3A, Cry3Ab, Cry3Bb, and Cry34Abl/Cry35Abl.

(12) Mitochondrial ATP biosynthetic enzyme inhibitor: diafenthiuron, azocyclotin, cyhexatin, fenbutatin oxide, propargite, and tetradifon.

(13) Oxidative phosphorylation uncoupler: chlorfenapyr, sulfluramid, DNOC, binapacryl, dinobuton, and dinocap.

(14) Nicotinic acetylcholine receptor channel blocker: bensultap, cartap hydrochloride, nereistoxin, thiosultap-sodium, and thiocyclam.

(15) Chitin synthesis inhibitor: bistrifluron, chlorfluazuron, diflubenzuron, flucycloxuron, flufenoxuron, hexaflumuron, lufenuron, novaluron, noviflumuron, teflubenzuron, triflumuron, buprofezin, and fluazuron.

(16) Diptera ecdysis disruptor: cyromazine.

(17) Molting hormone receptor agonist: chromafenozide, halofenozide, methoxyfenozide, and tebufenozide.

(18) Octopamine receptor agonist: amitraz, demiditraz, and chlordimeform.

(19) Mitochondrial electron transfer system complex III inhibitor: acequinocyl, fluacrypyrim, and hydramethylnon.

(20) Mitochondrial electron transfer system complex I inhibitor: fenazaquin, fenpyroximate, pyrimidifen, pyridaben, tebufenpyrad, tolfenpyrad, and rotenone.

(21) Potential dependent sodium channel blocker: indoxacarb and metaflumizone.

(22) Acetyl-CoA carboxylase inhibitor: spirodiclofen, spiromesifen, and spirotetramat.

(23) Mitochondrial electron transfer system complex IV inhibitor: aluminium phosphide, calcium phosphide, phosphine, zinc phosphide, and cyanide.

(24) Mitochondrial electron transfer system complex II inhibitor: cyenopyrafen, cyflumetofen, and pyflubumide.

(25) Ryanodine receptor modulator: chlorantraniliprole, cyantraniliprole, flubendiamide, cyclaniliprole, and tetraniliprole.

(26) Mixed function oxygenase inhibitor compound: piperonyl butoxide.

(27) Latrophilin receptor agonist: depsipeptide, cyclodepsipeptide, 24-membered cyclodepsipeptide, and emodepside.

(28) Other agents (having unknown mechanisms of action): azadirachtin, benzoximate, bifenazate, bromopropylate, quinomethionate, cryolite, dicofol, pyridalyl, benclothiaz, sulfur, amidoflumet, 1,3-dichloropropene, DCIP, phenisobromolate, benzomate, metaldehyde, chlorobenzilate, clothiazoben, dicyclanil, fenoxacrim, fentrifanil, flubenzimine, fluphenazine, gossyplure, japonilure, metoxadiazone, oil, potassium oleate, tetrasul, triarathene, afidopyropen, flometoquin, flufiprole, fluensulfone, meperfluthrin, tetramethylfluthrin, tralopyril, dimefluthrin, methylneodecanamide, fluralaner, afoxolaner, fluxametamide, 5-[5-(3,5-dichlorophenyl)-5-trifluoromethyl-4,5-dihydroisooxazol-3-yl]-2-(1H-1,2,4-triazol-1-yl)benzonitrile (CAS: 943137-49-3), broflanilide, other metadiamides, *Steinernema carpocapsae, Steinernema glaseri, Pasteuria penetrans, Paecilomyces tenuipes, Paecilomyces fumosoroseus, Beauveria bassiana, Beauveria brongniartii, Metarhizium anisopliae, Verticillium lecanii*, and acynonapyr.

(29) Insect repellent:
(a) Benzimidazole-based insect repellent: fenbendazole, albendazole, triclabendazole, oxibendazole, mebendazole, oxfendazole, parbendazole, flubendazole, febantel, netobimin, thiophanate, thiabendazole, and cambendazole;
(b) Salicylanilide-based insect repellent: closantel, oxyclozanide, rafoxanide, and niclosamide;
(c) Substituted phenol-based insect repellent: nitroxinil and nitroscanate;
(d) Pyrimidine-based insect repellent: pyrantel and morantel;
(e) Imidazothiazole-based insect repellent: levamisole and tetramisole;
(f) Tetrahydropyrimidine-based insect repellent: praziquantel and epsiprantel; and
(g) Other insect repellents: cyclodiene, ryania, clorsulon, metronidazole, demiditraz, piperazine, diethylcarbamazine, dichlorophen, monepantel, tribendimidine, amidantel, thiacetarsamide, melarsomine, and arsenamide.

Specific examples of the plant growth regulator that can be mixed with the agricultural and horticultural composition of the present invention for use or used in combination with the agricultural and horticultural composition will be shown below.

Abscisic acid, kinetin, benzylaminopurine, 1,3-diphenylurea, forchlorfenuron, thidiazuron, chlorfenuron, dihydrozeatin, gibberellin A, gibberellin A4, gibberellin A7, gibberellin A3, 1-methylcyclopropane, N-acetyl aminoethoxyvinyl glycine (another name: aviglycine), aminooxyacetate, silver nitrate, cobalt chloride, IAA, 4-CPA, cloprop, 2,4-D, MCPB, indole-3-butyrate, dichlorprop, phenothiol, 1-naphthylacetamide, ethychlozate, cloxyfonac, maleic acid hydrazide, 2,3,5-triiodobenzoic acid, salicylic acid, methyl salicylate, (−)-jasmonic acid, methyl jasmonate, (+)-strigol, (+)-deoxystrigol, (+)-orobanchol, (+)-sorgolactone, 4-oxo-4-(2-phenylethyl) aminobutyric acid, ethephon, chlormequat, mepiquat chloride, benzyladenine, 5-aminolevulinic acid, and daminozide.

The form of the agricultural and horticultural composition of the present invention is not particularly limited. For example, an agricultural and horticultural composition prepared by mixing a preparation containing the tetrazolyloxime component, a preparation containing the phosphite salt, and a preparation containing other components if needed at a predetermined ratio; an agricultural and horticultural composition prepared by mixing the tetrazolyloxime component, the phosphite salt, and other components if needed at a predetermined ratio and formulating the mixture; an agricultural and horticultural composition prepared by adding a preparation containing the tetrazolyloxime component, a preparation containing the phosphite salt, and a preparation containing other components if needed to a solvent or a dispersion medium such as water at a predetermined ratio; or the like is exemplified.

As the dosage form, a form that a common agricultural chemical can has may be exemplified; namely, as the dosage form, for example, a dust formulation (DP, dustable powder), wettable powder (WP), an emulsifiable concentrate (EC), a flowable (FL), a suspension (SC, suspension concentrate), a water soluble powder (SP), water dispersible granule (WG), a tablet, granule (GR), SE (suspo-emulsion), OD (oil dispersion), EW (emulsion oil in water), or the like may be exemplified. The formulation is not particularly limited depending on the technique or the procedure thereof, but is performed by a known technique or a known procedure. Formulation subsidiary materials such as various carriers, solvents, and additives to be used in formulation are not particularly limited.

For example, in a solid preparation, a carrier such as a vegetable powder such as soybean flour or flour; a mineral impalpable powder such as diatomite, apatite, gypsum, talc, bentonite, pyrophyllite, or clay; an organic compound and an inorganic compound such as soda benzoate, urea, and mirabilite may be used.

In a liquid preparation, a solvent such as an petroleum fraction such as kerosene, xylene, or solvent naphtha; cyclohexane; cyclohexanone; dimethylformamide, dimethyl sulfoxide; an alcohol; acetone; trichloroethylene; methyl isobutyl ketone; mineral oil; vegetable oil; or water may be used.

In the preparation, a surfactant may be added if needed to maintain a uniform stable form. As the surfactant, for example, a nonionic surfactant such as a polyoxyethylene-added alkyl phenyl ether, a polyoxyethylene-added alkyl ether, a polyoxyethylene-added higher fatty acid ester, a polyoxyethylene-added sorbitan higher fatty acid ester, or polyoxyethylene-added tristyryl phenyl ether or an ionic surfactant such as a polyoxyethylene-added sulfate ester salt of an alkyl phenyl ether, an alkylbenzenesulfonate, a sulfate ester salt of a higher alcohol, an alkylnaphthalenesulfonate salt, a polycarboxylate salt, lignin sulfonate salt, a formaldehyde condensate of an alkylnaphthalenesulfonate salt, or a copolymer of isobutylene-maleic anhydride may be exemplified.

One aspect of the method for controlling plant disease and accelerating plant growth of the present invention comprises applying the agricultural and horticultural composition of the present invention to plants (at least any of roots, stems, leaves, seeds, and flowers), soil, or hydroponic plowland.

In the case of wettable powder, an emulsion, or a flowable, the agricultural and horticultural composition of the present invention is diluted with water to a predetermined concentration to prepare a suspension or an emulsion, and the diluted composition is used for seed treatment, foliage sprinkling, soil application, or water surface application. In the case of granules or a dust, the composition is used for seed treatment, foliage sprinkling, soil application, or water surface application as it is. If the agricultural and horticultural composition of the present invention is used for soil application or water surface application, the composition is applied in an amount of 0.1 g or more per 1 hectare in terms of active ingredients. In the case of seed treatment using the agricultural and horticultural composition of the present invention, the active ingredients are applied in an amount of 0.1 g or more per 100 kg of seeds in terms of active ingredients. In the case of foliage treatment using the agricultural and horticultural composition of the present invention, the active ingredients are applied in an amount of 0.1 g or more per 1 hectare in terms of active ingredients. Although the amount of the agricultural and horticultural composition of the present invention applied changes also depending on meteorological conditions, application time, the application method, and application equipment, the amount is preferably 10 to 300 g and more preferable 20 to 120 g per 10 ares in terms of $P_2O_5$. The application concentration of the sprinkle solution of the agricultural and horticultural composition in the present invention is preferably 0.01 to 0.3% by mass and more preferably 0.02 to 0.12% by mass in terms of $P_2O_5$. The agricultural and horticultural composition of the present invention may be prepared or diluted, or the agricultural and horticultural composition of the present invention may be mixed with other components immediately before the application.

Another aspect of the method for controlling plant disease and accelerating plant growth of the present invention comprises simultaneously or successively applying the tetrazolyloxime component and the phosphite salt to plants, soil, or hydroponic plowland in random order.

In simultaneous application, the preparation containing the tetrazolyloxime component, the preparation containing the phosphite salt, and the preparation containing other components if needed is subjected to sprinkle, spray, or the like on plants, soil, or hydroponic plowland at a predetermined ratio simultaneously.

In successive application, the preparation containing the tetrazolyloxime component, the preparation containing the phosphite salt, and the preparation containing other components if needed is subjected to sprinkle, spray, irrigation, or the like on plants, soil, or hydroponic plowland at a predetermined ratio in random order. Although the application interval between the preparation containing the tetrazolyloxime component and the preparation containing the phosphite salt is not particularly limited in successive application, it is preferable to apply a component at the latter stage while a component at the former stage remains on plants, soil, or hydroponic plowland.

The agricultural and horticultural fungicide of the present invention may be used for controlling plant disease derived from widely various filamentous fungi, for example, fungi belonging to Oomycetes, Ascomycetes, Deuteromycetes, Basidiomycetes, and Zygomycetes, and bacteria.

Examples of plant disease (pathogenic microorganisms) to be controlled will be shown below.

Sugar beet: Cercospora leaf spot (*Cercospora beticola*), *Aphanomyces* root rot (*Aphanomyces cochlioides*), root rot (*Thanatephorus cucumeris*), Leaf blight (*Thanatephorus cucumeris*), rust (*Uromyces betae*), powdery mildew (*Oidium* sp.), Ramularia leaf spot (*Ramularia beticola*), seedling damping-off (*Aphanomyces cochlioides, Pythium ultimum*), and the like Peanut: brown leaf spot (*Mycosphaerella arachidis*), yeast spot disease (*Ascochyta* sp.), rust (*Puccinia arachidis*), damping-off (*Pythium debaryanum*), Alternaria leaf spot (*Alternaria alternata*), southern blight (*Sclerotium rolfsii*) leaf spot (*Mycosphaerella berkeleyi*), peg, pod and root necrosis (*Calonectria ilicicola*), and the like Cucumber: powdery mildew (*Sphaerotheca fuliginea*), downy mildew (*Pseudoperonospora cubensis*), gummy stem blight (*Mycosphaerella melonis*), Fusarium wilt (*Fusarium oxysporum*), Sclerotinia rot (*Sclerotinia sclerotiorum*), gray mold (*Botrytis cinerea*), anthracnose (*Colletotrichum orbiculare*), scab (*Cladosporium cucumerinum*), Corynespora leaf spot (*Corynespora cassiicola*), seedling damping-off (*Pythium debaryanum, Rhizoctonia solani* Kuhn), black root rot (*Phomopsis* sp.) bacterial spot (*Pseudomonas syringae* pv. *lachrymans*), and the like Tomato: gray mold (*Botrytis cinerea*), leaf mold (*Cladosporium fulvum*), late blight (*Phytophthora infestans*), Verticillium wilt (*Verticillium albo-atrum* and *Verticillium dahliae*), powdery mildew (*Oidium neolycopersici*), early blight (*Alternaria solani*), Cercospora leaf mold (*Pseudocercospora fuligena*), bacterial wilt (*Ralstonia solanacearum*), fruit rot (*Sclerotinia sclerotiorum*), and the like Eggplant: late blight (*Botrytis cinerea*), black blight (*Corynespora melongenae*), powdery mildew (*Erysiphe cichoracearum*), leaf mold (*Mycovellosiella nattrassii*), stem rot (*Sclerotinia sclerotiorum*), Verticillium wilt (*Verticillium dahliae*), brown spot (*Phomopsis vexans*), and the like Red pepper: *Phytophthora* blight (*Phytophthora capsici*), gray mold (*Botrytis cinerea*), Sclerotinia rot (*Sclerotinia sclerotiorum*), anthracnose (*Colletotrichum aenigma, Colletotrichum capsici, Colletotrichum fructicola*, and *Colletotrichum jiangxiense*), powdery mildew (*Leveillula taurica*), and the like Strawberry: gray mold (*Botrytis cinerea*), powdery mildew (*Sphaerotheca humuli*), anthracnose (*Colletotrichum acutatum, Colletotrichum fragariae*), Phytophthora rot (*Phytophthora cactorum*), soft rot of fruit (*Rhizopus stolonifer*), Fusarium wilt (*Fusarium oxysporum*), Verticillium-wilt (*Verticillium dahliae*), crown rot (*Sclerotinia sclerotiorum*), and the like Onion: gray-mold neck rot (*Botrytis allii*), gray mold (*Botrytis cinerea*), gray-mold neck rot (*Botrytis squamosa*), downy mildew (*Peronospora destructor*), *Phytophthora porri* foister (*Phytophthora porri*), leaf blight (*Ciborinia allii*), small sclerotial (*Botrytis squamosa*), Fusarium basal rot (*Fusarium oxysporum*), Pink root rot (*Pyrenochaeta terrestris*), white rot (*Sclerotium cepivorum*), rust (*Puccinia allii*), southern blight (*Sclerotium rolfsii*), and the like Welsh onion: bacterial soft rot (*Pectobacterium carotovorum*), downy mildew (*Peronospora destructor*), leaf spot (*Pleospora allii*), white rot (*Sclerotium cepivorum*), rust (*Puccinia allii*), leaf blight (*Botrytis squamosa*), southern blight (*Sclerotium rolfsii*), pink root rot (*Pyrenochaeta terrestris*), and the like Cabbage: clubroot (*Plasmodiophora brassicae*), bacterial soft rot (*Erwinia carotovora*), black rot (*Xanthomonas campesrtis* pv. *campestris*), bacterial leaf spot bacteriosis (*Pseudomonas syringae* pv. *maculicola* and P. s. pv. *alisalensis*), downy mildew (*Peronospora parasitica*), Sclerotinia rot (*Sclerotinia sclerotiorum*), Alternaria sooty spot (*Alternaria brassicicola*), gray mold (*Botrytis cinerea*), black leg (*Phoma lingam*), Pythium rot (*Pythium aphanidermatum, Pythium ultimum*), white rust (*Albugo macrospora*), and the like Lettuce: bacterial rot (*Pseudomonas cichorii, Pseudomonas marginalis*), bacterial soft rot (*Pectobacterium carotovorum*), downy mildew (*Bremia lactucae*), gray mold (*Botrytis cinerea*), stem rot (*Sclerotinia sclerotiorum*), bigvein disease (Mirafiori lettuce big-vein ophiovirus), root rot (*Fusarium oxysporum*), bottom rot (*Rhizoctonia solani*), powdery mildew (*Golovinomyces orontii*), and the like Kidney bean: stem rot (*Sclerotinia sclerotiorum*), gray mold (*Botrytis cinerea*), anthracnose (*Colletotrichum linde-

*muthianum*), angular leaf spot (*Phaeoisariopsis griseola*), bacterial blight (*Xanthomonas axonopodis*), and the like Pea: Mycosphaerella blight (*Mycosphaerella pinodes*), gray mold (*Botrytis cinerea*), sclerotinia rot (*Sclerotinia sclerotiorum*), powdery mildew (*Erysiphe pisi*), and the like Apple: powdery mildew (*Podosphaera leucotricha*), scab (*Venturia inaequalis*), blossom blight (*Monilinia mali*), fruit spot (*Mycosphaerella pomi*), *Valsa* canker (*Valsa mali*), *Alternaria* blotch (*Alternaria mali*), rust (*Gymnosporangium yamadae*), ring rot (*Botryosphaeria berengeriana*), bitter rot (*Glomerella cingulata, Colletotrichum acutatum*), blotch (*Diplocarpon mali*), fly speck (*Zygophiala jamaicensis*), sooty blotch (*Gloeodes pomigena*), violet root rot (*Helicobasidium mompa*), white root rot (*Rosellinia necatrix*), gray mold (*Botrytis cinerea*), fire blight (*Erwinia amylovora*), silver leaf (*Chondrostereum purpureum*), crown gall (*Rhizobium radiobacter, Rhizobium rhizogenes*), and the like Japanese Plum: scab (*Cladosporium carpophilum*), gray mold (*Botrytis cinerea*), brown rot (*Monilinia mumecola*), sooty blotch (*Peltaster* sp.), pocket (*Taphrina pruni*), brown shot hole (*Phloeosporella padi*), and the like Persimmon: powdery mildew (*Phyllactinia kakicola*), anthracnose (*Gloeosporium kaki*), angular leaf spot (*Cercospora kaki*), circular leaf spot (*Mycosphaerella nawae*), gray mold (*Botrytis cinerea*), fly speck (*Zygophiala jamaicensis*), and the like Peach: brown rot (*Monilinia fructicola, Monilia fructigena*), scab (*Cladosporium carpophilum*), Phomopsis rot (*Phomopsis* sp.), bacterial shot hole (*Xanthomonas campestris* pv. *pruni*), leaf curl (*Taphrina deformans*), anthracnose (*Colletotrichum gloeosporioides*), Cylindrosporium leaf spot (*Phloeosporella padi*), Coriolus stem rot (*Coriolus versicolor*), and the like Almond: brown rot (*Monilinia laxa*), leaf spot (*Stigmina carpophila*), scab (*Cladosporium carpophilum*), leaf blister (*Polystigma rubrum*), *Alternaria* blotch (*Alternaria alternata*), anthracnose (*Colletotrichum gloeosporioides*), and the like Yellow peach: brown rot (*Monilinia fructicola*), anthracnose (*Colletotrichum acutatum*), black spot (*Alternaria* sp.), young-fruit rot (*Monilinia kusanoi*), Cylindrosporium leaf spot (*Mycosphaerella cerasella*), powdery mildew (*Podosphaera tridactyla*), and the like Grape: gray mold (*Botrytis cinerea*), powdery mildew (*Uncinula necator*), ripe rot (*Glomerella cingulata, Colletotrichum acutatum*), downy mildew (*Plasmopara viticola*), bird's eye rot (*Elsinoe ampelina*), leaf blight (*Pseudocercospora vitis*), black rot (*Guignardia bidwellii*), white rot (*Coniella castaneicola*), rust (*Phakopsora ampelopsidis*), cottony bunch (pathogenic microorganism is unidentified), crown gall (*Rhizobium radiobacter, Rhizobium vitis*), and the like Pear: scab (*Venturia nashicola*), rust (*Gymnosporangium asiaticum*), black spot (*Alternaria kikuchiana*), ring rot (*Botryosphaeria berengeriana*), powdery mildew (*Phyllactinia mali*), Phomopsis canker (*Phomopsis fukushii*), brown spot (*Stemphylium vesicarium*), anthracnose (*Glomerella cingulata*), and the like Tea: gray blight (*Pestalotiopsis longiseta, P. theae*), anthracnose (*Colletotrichum theae-sinensis*), net blister blight (*Exobasidium reticulatum*), Bacterial shoot blight (*Pseudomonas syringae*), blister blight (*Exobasidium vexans*), and the like Citrus: spot anthracnose (*Elsinoe fawcettii*), blue mold (*Penicillium italicum*), green mold (*Penicillium digitatum*), gray mold (*Botrytis cinerea*), black spot (*Diaporthe citri*), canker (*Xanthomonas campestris* pv. *citri*), powdery mildew (*Oidium* sp.), *Phytophthora* rot (*Phytophthora citrophthora*), anthracnose (*Colletotrichum fioriniae*), and the like Kiwi fruit: bacterial blossom blight (*Pseudomonas marginalis, Pseudomonas syringae, Pseudomonas viridiflava*), bacterial canker (*Pseudomonas syringae*), gray mold (*Botrytis cinerea*), soft rot (*Botryosphaeria dothidea, Diaporthe* sp., *Lasiodiplodia theobromae*), sooty spot (*Pseudocercospora actinidiae*), and the like Olive: anthracnose (*Colletotrichum acutatum, Colletotrichum gloeosporioides*), peacock spot (*Spilocaea oleaginea*), and the like Chestnut: anthracnose (*Colletotrichum gloeosporioides*) and the like Wheat: powdery mildew (*Blumeria graminisf.* sp. *tritici*), scab (*Gibberella zeae, Fusarium avenaceum, Fusarium culmorum, Fusarium crookwellense, Microdochium nivale*), brown rust (*Puccinia recondita*), stripe rust (*Puccinia striiformis*), browning root rot (*Pythium iwayamai*), snow mold (*Monographella nivalis*), eyespot (*Pseudocercosporella herpotrichoides*), speckled leaf blotch (*Septoria tritici*), glume blotch (*Leptosphaeria nodorum*), *Typhula* snow blight (*Typhula incarnata*), Sclerotinia snow blight (*Myriosclerotinia borealis*), take-all (*Gaeumannomyces graminis*), ergot (*Claviceps purpurea*), bunt (*Tilletia caries*), loose smut (*Ustilago nuda*), blast (*Pyricularia grisea*), damping-off (*Pythium* spp., *Fusarium* spp., *Rhizoctonia* spp.), seedling blight (*Pythium* spp., *Fusarium* spp., *Rhizoctonia* spp.), and the like Barley: stripe (*Pyrenophora graminea*), net blotch (*Pyrenophora teres*), scald (*Rhynchosporium secalis*), loose smut (*Ustilago tritici, U. nuda*), damping-off (*Pythium* spp., *Fusarium* spp., *Rhizoctonia* spp.), seedling blight (*Pythium* spp., *Fusarium* spp., *Rhizoctonia* spp.), and the like Rice: blast (*Pyricularia oryzae*), sheath blight (*Rhizoctonia solani*), "Bakanae" disease (*Gibberella fujikuroi*), helminthosporium leaf spot (*Cochliobolus miyabeanus*), seedling blight (*Pythium graminicola*), bacterial leaf blight (*Xanthomonas oryzae*), bacterial seedling blight (*Burkholderia plantarii*), bacterial brown stripe (*Acidovorax avenae*), Bacterial grain rot (*Burkholderia glumae*), Cercospora leaf spot (*Cercospora oryzae*), false smut (*Ustilaginoidea virens*), discoloured rice grains (*Alternaria alternata, Curvularia intermedia*), Kernel discoloration (*Alternaria padwickii*), pink coloring of rice grains (*Epicoccum purpurascens*), and the like Tobacco: Sclerotinia stem-rot (*Sclerotinia sclerotiorum*), powdery mildew (*Erysiphe cichoracearum*), black shank (*Phytophthora nicotianae*), and the like Tulip: gray mold (*Botrytis cinerea*), *Botrytis* blight (*Botrytis tulipae*), leaf rot (*Rhizoctonia solani*), bulb rot (*Fusarium oxysporum*), bulb-coat rot (*Rhizoctonia solani*), and the like Rose: black spot (*Diplocarpon rosae*), powdery mildew (*Erysiphe simulans, Podosphaera pannosa*), *Botrytis* blight (*Botrytis cinerea*), and the like Chrysanthemum: *Botrytis* blight (*Botrytis cinerea*), rust (*Puccinia horiana*), downy mildew (*Paraperonospora minor, Peronospora danica*), *Pythium* blight (*Pythium aphanidermatum, Pythium dissotocum, Pythium helicoides, Pythium oedochilum, Pythium sylvaticum*), root and stem rot (*Rhizoctonia solani*), Fusarium blight (*Fusarium solani*), and the like Gerbera: gray mold (*Botrytis cinerea*), powdery mildew (*Podosphaera xanthii*), and the like Lily: *Botrytis* blight (*Botrytis elliptica, Pestalotiopsis* sp.), gray mold (*Botrytis cinerea*), and the like Sunflower: downy mildew (*Plasmopara halstedii*), sclerotinia rot (*Sclerotinia sclerotiorum*), gray mold (*Botrytis cinerea*), and the like Bent grass: *Sclerotinia* snow blight (*Sclerotinia borealis*), large patch (*Rhizoctonia solani*), brown patch (*Rhizoctonia solani*), dollar spot (*Sclerotinia homoeocarpa*), blast (*Pyricularia* sp.), *Pythium* red blight (*Pythium aphanidermatum*), anthracnose (*Colletotrichum graminicola*), grass bacterial brown stripe (*Acidovorax avenae*), and the like Orchard grass: powdery mildew (*Erysiphe graminis*) and the like Soybean: purple stain (*Cercospora kikuchii*), downy mildew (*Peronospora manshurica*), stem rot (*Phytophthora sojae*), rust (*Phakopsora pachyrhizi*), Sclerotinia rot (*Sclerotinia sclerotiorum*), anthracnose (*Colletotrichum truncatum*), gray mold (*Botrytis cinerea*), Sphaceloma scab (*Elsinoe glycines*), pod and stem blight (*Diaporthe phaseolorum* var. *sojae*), damping-off (*Pythium* spp., *Fusarium* spp., *Rhizoctonia* spp.), seedling blight (*Pythium* spp., *Fusarium* spp., *Rhizoctonia* spp.), and the like Potato: late blight (*Phytophthora infestans*), early blight (*Alternaria solani*), black scurf (*Thanatephorus cucumeris*), *Verticillium* wilt (*Verticillium albo-atrum, V. dahliae, V. nigrescens*), Black leg (*Pectobacterium atrosepticum*), bacterial soft rot (*Pectobacterium carotovorum*), gray mold (*Botrytis cinerea*), scab (*Streptomyces* spp.), Sclerotial rot (*Sclerotinia sclerotiorum*), and the like Yam: leaf mold (*Cylindrosporium dioscoreae*), anthracnose (*Colletotrichum gloeosporioides*), blue mold (*Penicillium sclerotigenum*), and the like Sweet potato: violet root rot (*Helicobasidium mompa*), stem rot (*Fusarium oxysporum*), and the like Taro: *Phytophthora* blight (*Phytophthora colocasiae*), *Rhizoctonia* stem rot (*Rhizoctonia solani*), and the like Ginger: root rot (*Pythium ultimum, Pythium myriotylum*), leaf spot (*Phyllosticta zingiberis*), and the like Banana: Panama disease (*Fusarium oxysporum*), Sigatoka disease (*Mycosphaerella fijiensis, M. musicola*), and the like Mango: anthracnose (*Colletotrichum aenigma*), bacterial canker (*Xanthomonas campestris*), stem-end rot (*Diaporthe pseudophoenicicola, Lasiodiplodia theobromae, Lasiodiplodia* spp., *Neofusicoccum parvum, Neofusicoccum* sp.), gray mold (*Botrytis cinerea*), and the like Rapeseed: *Sclerotinia* rot (*Sclerotinia sclerotiorum*), root rot (*Phoma lingam*), gray leaf spot (*Alternaria brassicae*), powdery mildew (*Erysiphe cruciferarum, Erysiphe cichoracearum, Oidium matthiolae*), downy mildew (*Peronospora parasitica*), and the like Coffee: rust (*Hemileia vastatrix*), anthracnose (*Colletotrichum coffeanum*), leaf spot (*Cercospora coffeicola*), and the like Sugarcane: brown rust (*Puccinia melanocephala*) and the like Corn: Zonate leaf spot (*Gloeocercospora sorghi*), rust (*Puccinia sorghi*), southern rust (*Puccinia polysora*), smut (*Ustilago maydis*), southern leaf blight (*Cochliobolus heterostrophus*), northern leaf blight (*Setosphaeria turcica*), damping-off (*Pythium* spp., *Fusarium* spp., *Rhizoctonia* spp.), seedling blight (*Pythium* spp., *Fusarium* spp., *Rhizoctonia* spp.), and the like Cotton: seedling blight (*Pythium* sp.), rust (*Phakopsora gossypii*), frosty mildew (*Mycosphaerella areola*), anthracnose (*Glomerella gossypii*), and the like Hop: downy mildew (*Pseudoperonospora humuli*), powdery mildew (*Oidium* sp., *Podosphaera macularis*), gray mold (*Botrytis cinerea*), and the like The agricultural and horticultural plants that the present invention can target are not particularly limited.

For example, plants of Solanaceae such as tomato (*Solanum lycopersicum*), eggplant (*Solanum melongena*), potato (*Solanum tuberosum*), red pepper (*Capsicum annuum*), and green pepper;

plant of Brassicaceae such as Japanese radish (*Raphanus sativus*), Chinese cabbage (*Brassica rapa* var. *pekinensis*), cabbage (*Brassica oleracea* var. *capitata*), turnip (*Brassica rapa* var. *glabra*), broccoli (*Brassica oleracea* var. *italica*), komatsuna (*Brassica rapa* var. *perviridis*) and cauliflower (*Brassica oleracea* var. *botrytis*);

plants of Cucurbitaceae such as cucumber (*Cucumis sativus* L.), pumpkin (*Cucurbita*), watermelon, and zucchini;

plants of Fabaceae, syn. Leguminosae, such as soybean (*Glycine max*), dry bean, and kidney bean;

plants of Rosaceae such as apple, pear, peach, rose, and strawberry;

plants of Lamiaceae such as beefsteak plant (*Perilla frutescens* var. *crispa*);

plants of Asteraceae such as garland chrysanthemum (*Glebionis coronaria*), lettuce (*Lactuca sativa*), chrysanthemum (*C. morifolium*), and sunflower (*H. annuus*);

plants of Araceae such as taro (*Colocasia esculenta* (L.) Schott);

plants of Apiaceae such as celery (*Apium graveolens* var. *dulce*), carrot (*Daucus carota* subsp. *sativus*), parsley (*Petroselinum crispum*), and Japanese honewort (*Cryptotaenia canadensis*);

plants of Amaryllidaceae such as onion (*Allium cepa*), Welsh onion (*Allium fistulosum* L), scallion (*Allium tuberosum*), shallot (*Allium chinense*), and spring onion (*Allium cepa* var. *proliferum*);

plants of Malvaceae such as okra (*Abelmoschus esculentus*);

plants of Asparagaceae such as asparagus (*Asparagus*);

plants of Amaranthaceae such as sugar beet (*Beta vulgaris* ssp. *vulgaris*) and spinach;

plants of Zingiberaceae such as ginger and Japanese ginger;

plants of Rutaceae such as satsuma mandarin;

plants of Vitaceae such as grape;

plants of Musaceae such as banana;

plants of Ebenaceae such as persimmon;

plants of Gramineae such as oat (*Avena sativa*), adlay (*Coix lacryma-jobi* var. *ma-yuen*), orchard grass (*Dactylis glomerata*), barley (*Hordeum vulgare*), rice (*Oryza sativa*), timothy (*Phleum pratense*), sugarcane (*Saccharum officinarum*), rye (*Secale cereale*), foxtail millet (*Setaria italica*), bread wheat (*Triticum aestivum*), corn (*Zea mays*), and lawn grass (*Zoysia* spp.); and the like may be exemplified.

The agricultural and horticultural plants that the present invention can target may be improved varieties and varieties, cultivars, in addition, mutants, hybrids, and genetically modified organisms (GMOs) of these plants.

Although effects of the present invention will be described below by showing specific examples, the present invention is not limited to these.

EXAMPLE 1

A flowable containing 5.0% of a tetrazolyloxime component (t-butyl (6-{[(Z)-(1-methyl-1H-5-tetrazolyl)(phenyl)methylene]aminooxymethyl}-2-pyridyl)carbamate) (chemical 1) was provided. A colorless and transparent liquid containing a phosphite salt (potassium phosphite: 31% in terms of $P_2O_5$ and 25% in terms of $K_2O$) and having a specific gravity of 1.5 and a pH of 6 to 7 (chemical 2) was provided.

The chemical 1 was diluted with water to obtain chemical liquid containing 50 ppm of the tetrazolyloxime component (Ia). The chemical 2 was diluted with water to obtain chemical liquid containing 277 ppm of the phosphite salt (in terms of $P_2O_5$) (IIa).

The chemical 1 and the chemical 2 were mixed, and the mixture was diluted with water to obtain chemical liquid containing 50 ppm of the tetrazolyloxime component and 277 ppm of the phosphite salt (in terms of $P_2O_5$) (IIIa).

[Grape Downy Mildew Test]

The chemical liquids (Ia), (IIa), and (IIIa) were sprinkled on areas of grapes in the new treetop growth period contracting grape downy mildew (*Plasmopara viticola*) at 350 L/10a 3 times at intervals of around 10 days to 2 weeks, respectively. The incidence of disease of grape downy mildew (one tree an area, 3-times repetition) was calculated 19 days after the third sprinkle to find the preventive value.

The expected value of the preventive value of the chemical liquid (IIIa) was calculated from the preventive value of the chemical liquid (Ia) and the preventive value of the chemical liquid (IIa) using Colby's equation, (S. R. Colby, Calculating synergistic and antagonistic responses of herbicide combinations, Weeds, 15, 20-22 pp (1967)). The expected value calculated by Colby's equation indicates the additive effect of the chemical liquid (Ia) and the chemical liquid (IIa).

$$E = M + N - (M \times N/100)$$

M represents the preventive value (%) in the single application of the chemical liquid (Ia). N is the preventive value (%) in the single application of the chemical liquid (IIa). E is the expected value of the preventive value in the application of the combination of the chemical liquid (Ia) and the chemical liquid (IIa) (chemical liquid (IIIa)) (%). If the measured value of the preventive value in the application of the combination of the chemical liquid (Ia) and the chemical liquid (IIa) (chemical liquid (IIIa)) (%) is larger than the expected value E, the application of the combination of the chemical liquid (Ia) and the chemical liquid (IIa) (chemical liquid (IIIa)) produces a synergistic effect. Table 1 shows the measured values and the expected value of the preventive values.

TABLE 1

Grape downy mildew (leaf)

| | Component composition | Component concentration [ppm] | Preventive value [%] Measured value | Preventive value [%] Expected value |
|---|---|---|---|---|
| Chemical liquid (IIIa) | Tetrazolyloxime component + Phosphite salt | 50 + 277 | 83.4 | 65.5 |
| Chemical liquid (Ia) | Tetrazolyloxime component | 50 | 58.2 | — |
| Chemical liquid (IIa) | Phosphite salt | 277 | 17.5 | — |

As shown in Table 1, the chemical liquid (IIIa) has produced a synergistic effect on the preventive value of grape downy mildew.

A harmful effect of the chemical was not observed, either.

[Potato Late Blight Test]

The chemical liquids (Ia), (IIa), and (IIIa) were sprinkled on areas of a farm in which potato late blight (*Phytophthora infestans*) was generated at 100 L/10 a twice at an interval of around two weeks, respectively. The incidence of disease of potato late blight (24 plants an area, 3-times repetition) was calculated 13 days after the second sprinkle to find the preventive value. Table 2 shows the measured values and the expected value of the preventive values.

TABLE 2

Potato late blight

| | Component composition | Component concentration [ppm] | Preventive value [%] Measured value | Preventive value [%] Expected value |
|---|---|---|---|---|
| Chemical liquid (IIIa) | Tetrazolyloxime component + Phosphite salt | 50 + 277 | 46.0 | 36.9 |
| Chemical liquid (Ia) | Tetrazolyloxime component | 50 | 33.0 | — |
| Chemical liquid (IIa) | Phosphite salt | 277 | 5.8 | — |

As shown in Table 2, the chemical liquid (IIIa) has produced a synergistic effect on the preventive value of potato late blight. A harmful effect of the chemical was not observed, either.

[Tomato Late Blight Test]

The chemical liquids (Ia), (IIa), and (IIIa) were sprinkled on areas of tomato seedlings in which tomato late blight (*Phytophthora infestans*) was generated at 200 L/10 a once, respectively. The incidence of disease of tomato late blight (4 plants an area, 3-times repetition) was calculated 7 days after and 14 days after the sprinkle to find the preventive values. Table 3 shows the measured values and the expected values of the preventive values.

TABLE 3

Tomato late blight

| | Component composition | Component concentration [ppm] | Preventive value after 4 days [%] Measured value | Preventive value after 4 days [%] Expected value | Preventive value after 14 days [%] Measured value | Preventive value after 14 days [%] Expected value |
|---|---|---|---|---|---|---|
| Chemical liquid (IIIa) | Tetrazolyloxime component + Phosphite salt | 50 + 277 | 65.1 | 62.1 | 76.8 | 75.2 |

TABLE 3-continued

| | | | Tomato late blight | | | |
|---|---|---|---|---|---|---|
| | | Component | Preventive value after 4 days [%] | | Preventive value after 14 days [%] | |
| | Component composition | concentration [ppm] | Measured value | Expected value | Measured value | Expected value |
| Chemical liquid (Ia) | Tetrazolyloxime component | 50 | 43.3 | — | 71.9 | — |
| Chemical liquid (IIa) | Phosphite salt | 277 | 33.2 | — | 11.8 | — |

As shown in Table 3, the chemical liquid (IIIa) has produced a synergistic effect on the preventive value of tomato late blight.

A harmful effect of the chemical was not observed, either.

[Wheat Browning Root Rot Test]

The chemical liquids (Ia), (IIa), and (IIIa) were sprinkled on areas of wheat in which wheat browning root rot (*Pythium iwayamai*) was generated at 100 L/10 a once, respectively. The incidence of disease of wheat browning root rot (9 m² an area, 3-times repetition) was calculated 72 days after the sprinkle to find the preventive value. Table 4 shows the measured values and the expected value of the preventive values.

TABLE 4

| | | Wheat browning root rot | | |
|---|---|---|---|---|
| | | Component | Preventive value [%] | |
| | Component composition | concentration [ppm] | Measured value | Expected value |
| Chemical liquid (IIIa) | Tetrazolyloxime component + Phosphite salt | 50 + 277 | 100 | 92.3 |
| Chemical liquid (Ia) | Tetrazolyloxime component | 50 | 89.5 | — |
| Chemical liquid (IIa) | Phosphite salt | 277 | 26.3 | — |

As shown in Table 4, the chemical liquid (IIIa) has produced a synergistic effect on the preventive value of wheat browning root rot. A harmful effect of the chemical was not observed, either.

EXAMPLE 2

A flowable containing 5.0% of a tetrazolyloxime component (t-butyl (6-{[(Z)-(1-methyl-1H-5-tetrazolyl)(phenyl)methylene]aminooxymethyl}-2-pyridyl)carbamate) (chemical 1) was provided.

A colorless and transparent liquid containing a phosphite salt (potassium phosphite) (chemical 2) was provided.

The chemical 1 was diluted with water to obtain chemical liquid containing 1 ppm of the tetrazolyloxime component (Ib).

The chemical 2 was diluted with water to obtain chemical liquid containing 30 ppm of the phosphite salt (in terms of $P_2O_5$) (IIb).

The chemical 1 and the chemical 2 were mixed, and the mixture was diluted with water to obtain chemical liquid containing 1 ppm of the tetrazolyloxime component and 30 ppm of the phosphite salt (in terms of $P_2O_5$) (IIIb).

[Test on Vigorous Seedling Effect on Rice: Increase in the Number of Roots]

Rice seeds (kind: Koshihikari) were immersed in water. Then, the rice seeds were sown in granular ridging and budding-treated at 30° C. for 48 hours. Subsequently, the roots were cut off with 1 to 2 mm of the roots left. They were immersed in the above-mentioned chemical liquids and subjected to hydroponics. The number of roots were measured 5 days after the cultivation start. The test was performed 9 times repeatedly. Table 5 shows the average value of the numbers of the roots.

The expected value of the rate of increase in the number of roots in the chemical liquid (IIIb) was calculated from the measured value of the rate of increase in the number of roots of the chemical liquid (Ib) and the measured value of the rate of increase in the number of roots of the chemical liquid (IIb) using Colby's equation (S. R. Colby, Calculating synergistic and antagonistic responses of herbicide combinations, Weeds, 15, 20-22 pp (1967)). The expected value calculated by Colby's equation indicates the additive effect of the chemical liquid (Ib) and the chemical liquid (IIb).

$$E = M + N - (M \times N/100)$$

M represents the measured value of the rate of increase in the number of roots in the single application of the chemical liquid (Ib). N represents the measured value of the rate of increase in the number of roots in the single application of the chemical liquid (IIb). E represents the expected value of the rate of increase in the number of roots in the application of the combination of the chemical liquid (Ib) and the chemical liquid (IIb) (chemical liquid (IIIb)). If the measured value of the rate of increase in the number of roots in the application of the combination of the chemical liquid (Ib) and the chemical liquid (IIb) (chemical liquid (IIIb)) is larger than the expected value E, the application of the combination of the chemical liquid (Ib) and the chemical liquid (IIb) (chemical liquid (IIIb)) produces a synergistic effect. Table 5 shows the measured values and the expected value of the rates of increase in the number of roots.

TABLE 5

| | | | Average | Rate of increase in number of roots [%] | |
|---|---|---|---|---|---|
| | Component composition | Component concentration [ppm] | value of number of roots | Measured value | Expected value |
| Chemical liquid (IIIb) | Tetrazolyloxime component + Phosphite salt | 1 + 30 | 4.8 | 26.3 | 10.5 |
| Chemical liquid (Ib) | Tetrazolyloxime component | 1 | 4.3 | 13.2 | — |
| Chemical liquid (IIb) | Phosphite salt | 30 | 3.7 | −2.6 | — |
| Water | — | 0 | 3.8 | — | — |
| Chemical liquid (IVb) | Tetrazolyloxime component + Phosphorous acid | 1 + 30 | 4.0 | 5.3 | — |

As shown in Table 5, the measured value of the rates of increase in the number of roots exceeds the expected value by the synergistic effect of the tetrazolyloxime component and the phosphite salt.

COMPARATIVE EXAMPLE 1

A flowable containing 5.0% of a tetrazolyloxime component (t-butyl (6-{[(Z)-(1-methyl-1H-5-tetrazolyl)(phenyl)methylene]aminooxymethyl}-2-pyridyl)carbamate) (chemical 1) was provided.

A colorless and transparent liquid containing phosphorous acid (chemical 3) was provided.

The chemical 1 and the chemical 3 were mixed, and the mixture was diluted with water to obtain chemical liquid containing 1 ppm of the tetrazolyloxime component and 30 ppm of phosphorous acid (in terms of $P_2O_5$) (IVb).

A test on vigorous seedling effect on the rice was performed by the same method as in Example 2 except that the chemical liquid (IVb) was used instead of the chemical liquid (IIIb). Table 5 shows the results. In the case of the combination of the tetrazolyloxime component and phosphorous acid, the measured value of the rate of increase in the number of roots is low.

EXAMPLE 3

A flowable containing 5.0% of a tetrazolyloxime component (t-butyl (6-{[(Z)-(1-methyl-1H-5-tetrazolyl)(phenyl)methylene]aminooxymethyl}-2-pyridyl)carbamate) (chemical 1) was provided.

A colorless and transparent liquid containing a phosphite salt (potassium phosphite) (chemical 2) was provided.

The chemical 1 and the chemical 2 were mixed, and the mixture was diluted with water to obtain chemical liquid containing 0.3 ppm of the tetrazolyloxime component and 0.01 ppm of the phosphite salt (in terms of $P_2O_5$) (IIIc).

A test on vigorous seedling effect on the rice was performed by the same method as in Example 2 except that the chemical liquid (IIIc) was used instead of the chemical liquid (IIIb). Table 6 shows the results.

TABLE 6

| | Component composition | Component concentration [ppm] | Average value of number of roots | Rate of increase in number of roots [%], Measured value |
|---|---|---|---|---|
| Chemical liquid (IIIc) | Tetrazolyloxime component + Phosphite salt | 0.3 + 0.01 | 4.6 | 21.1 |
| Water | — | — | 3.8 | — |
| Chemical liquid (IVc) | Tetrazolyloxime component + Phosphorous acid | 0.3 + 0.01 | 4.1 | 7.9 |

COMPARATIVE EXAMPLE 2

A flowable containing 5.0% of a tetrazolyloxime component (t-butyl (6-{[(Z)-(1-methyl-1H-5-tetrazolyl)(phenyl)methylene]aminooxymethyl}-2-pyridyl)carbamate) (chemical 1) was provided.

A colorless and transparent liquid containing phosphorous acid (chemical 3) was provided.

The chemical 1 and the chemical 3 were mixed, and mixture was diluted with water to obtain chemical liquid containing 0.3 ppm of the tetrazolyloxime component and 0.01 ppm of phosphorous acid (in terms of $P_2O_5$) (IVc).

A test on vigorous seedling effect on the rice was performed by the same method as in Example 2 except that the chemical liquid (IVc) was used instead of the chemical liquid (IIIb). Table 6 shows the results. In the case of the combination of the tetrazolyloxime component and phosphorous acid, the measured value of the rate of increase in the number of roots is low.

EXAMPLE 4

A flowable containing 5.0% of a tetrazolyloxime component (t-butyl (6-{[(Z)-(1-methyl-1H-5-tetrazolyl)(phenyl)methylene]aminooxymethyl}-2-pyridyl)carbamate) (chemical 1) was provided.

A colorless and transparent liquid containing a phosphite salt (potassium phosphite) (chemical 2) was provided.

The chemical 1 was diluted with water to obtain chemical liquid containing 1 ppm of the tetrazolyloxime component (Id).

The chemical 2 was diluted with water to obtain chemical liquid containing 1 ppm of the phosphite salt (in terms of $P_2O_5$) (IId).

The chemical 1 and the chemical 2 were mixed, and the mixture was diluted with water to obtain chemical liquid containing 1 ppm of the tetrazolyloxime component and 1 ppm of the phosphite salt (in terms of $P_2O_5$) (IIId).

[Test on Vigorous Seedling Effect on Rice: Root Growth]

Rice seeds (kind: Koshihikari) were immersed in water. Then, the rice seeds were sown in granular ridging and budding-treated at 30° C. for 48 hours. Subsequently, the roots were cut off with 1 to 2 mm of the roots left. They were immersed in the above-mentioned chemical liquids and subjected to hydroponics. The root lengths (maximum root lengths) were measured 5 days after the cultivation start. The test was performed 9 times repeatedly. Table 7 shows the average value of the root length.

The expected value of the root growth rate in the chemical liquid (IIId) was calculated from the measured value of the root growth rate of the chemical liquid (Id) and the measured value of the root growth rate of the chemical liquid (IId) using Colby's equation, (S. R. Colby, Calculating synergistic and antagonistic responses of herbicide combinations, Weeds, 15, 20-22 pp (1967)). The expected value calculated by Colby's equation indicates the additive effect of the chemical liquid (Id) and the chemical liquid (IId).

$$E = M + N - (M \times N / 100)$$

M represents the measured value of the root growth rate in the single application of the chemical liquid (Id). N represents the measured value of the root growth rate in the single application of the chemical liquid (IId). E represents the expected value of the root growth rate in the application of the combination of the chemical liquid (Id) and the chemical liquid (IIb) (chemical liquid (IIId)). If the measured value of the root growth rate in the application of the combination of the chemical liquid (Id) and the chemical liquid (IId) (chemical liquid (IIId)) is larger than the expected value E, the application of the combination of the chemical liquid (Id) and the chemical liquid (IId) (chemical liquid (IIId)) produces a synergistic effect. Table 7 shows the measured values and the expected value of the root growth rate.

TABLE 7

| Component composition | | Component concentration [ppm] | Root length [mm] | Root growth rate [%] | |
|---|---|---|---|---|---|
| | | | | Measured value | Expected value |
| Chemical liquid (IIId) | Tetrazolyloxime component + Phosphite salt | 1 + 1 | 46.3 | 17.5 | 13.7 |
| Chemical liquid (Id) | Tetrazolyloxime component | 1 | 44.2 | 12.2 | — |
| Chemical liquid (IId) | Phosphite salt | 1 | 40.0 | 1.5 | — |
| Water | — | — | 39.4 | — | — |
| Chemical liquid (IVd) | Tetrazolyloxime component + Phosphorous acid | 1 + 1 | 42.3 | 7.4 | — |

As shown in Table 7, the measured value of the root growth rate exceeds the expected value by the synergistic effect of the tetrazolyloxime component and the phosphite salt.

COMPARATIVE EXAMPLE 3

A flowable containing 5.0% of a tetrazolyloxime component (t-butyl (6-{[(Z)-(1-methyl-1H-5-tetrazolyl)(phenyl)methylene]aminooxymethyl}-2-pyridyl)carbamate) (chemical 1) was provided.

A colorless and transparent liquid containing phosphorous acid (chemical 3) was provided.

The chemical 1 and the chemical 3 were mixed, and the mixture was diluted with water to obtain chemical liquid containing 1 ppm of the tetrazolyloxime component and 1 ppm of phosphorous acid (in terms of $P_2O_5$) (IVd).

The test on vigorous seedling effect on the rice was performed by the same method as in Example 4 except that the chemical liquid (IVd) was used instead of the chemical liquid (IIId). Table 7 shows the results. In the case of the combination of the tetrazolyloxime component and phosphorous acid, the measured value of the root growth rate is low.

EXAMPLE 5

A granular wettable powder containing 20.0% of a tetrazolyloxime component (t-butyl (6-{[(Z)-(1-methyl-1H-5-tetrazolyl)(phenyl)methylene]aminooxymethyl}-2-pyridyl)carbamate) (chemical 4) was provided.

A potassium phosphite solution (LBG-01F34 (DE SANGOSSE: 730 g/L potassium phosphite)) (chemical 5) was provided.

The chemical 4 was diluted with water to obtain chemical liquid containing 200 ppm of the tetrazolyloxime component (Ie). The chemical 5 was diluted with water to obtain chemical liquid containing 8000 ppm of potassium phosphite (IIe).

The chemical 4 and the chemical 5 were mixed, and the mixture was diluted with water to obtain chemical liquid containing 200 ppm of the tetrazolyloxime component and 8000 ppm of potassium phosphite (IIIe).

[Grass Bacterial Brown Stripe (*Acidovorax Avenae*) Test]

Chemical liquids (Ie), (IIe), and (IIIe) were sprinkled on grass (kind: bentgrass, 14 days after the sowing) in a pot (7 cm in length×7 cm in width×3 cm in height). The grass was left to stand for 1 day, scissors were then immersed in 100,000,000 bacteria/ml *Acidovorax avenae* culture solution, and the grass was subjected to trimming inoculation. The grass was left to stand in a greenhouse for 6 days, and the preventive value was then calculated from the number of individuals contracting the disease (the number of lesions having maximum lengths of 2 mm or more: 3-times repetition).

The expected value of the preventive value in the chemical liquid (IIIe) was calculated from the preventive value of the chemical liquid (Ie) and the preventive value of the chemical liquid (IIe) using Colby's equation, (S. R. Colby, Calculating synergistic and antagonistic responses of herbicide combinations, Weeds, 15, 20-22 pp (1967)). The expected value calculated by Colby's equation indicates the additive effect of the chemical liquid (Ie) and the chemical liquid (IIe).

$$E = M + N - (M \times N/100)$$

M represents the preventive value in the single application of the chemical liquid (Ie) (%). N is the preventive value in the single application of the chemical liquid (IIe) (%). E is the expected value of the preventive value in the application of the combination of the chemical liquid (Ie) and the chemical liquid (IIe) (chemical liquid (IIIe)) (%). If the measured value of the preventive value in the application of the combination of the chemical liquid (Ie) and the chemical liquid (IIe) (chemical liquid (IIIe)) (%) is larger than the expected value E, the application of the combination of the chemical liquid (Ie) and the chemical liquid (IIe) (chemical liquid (IIIe)) produces a synergistic effect. Table 8 shows the measured values and the expected value of the preventive values.

TABLE 8

| Component composition | | Component concentration [ppm] | Preventive value [%] | |
|---|---|---|---|---|
| | | | Measured value | Expected value |
| Chemical liquid (IIIe) | Tetrazolyloxime component + Phosphite salt | 200 + 8000 | 83.0 | 77.0 |
| Chemical liquid (Ie) | Tetrazolyloxime component | 200 | 58.5 | — |
| Chemical liquid (IIe) | Phosphite salt | 8000 | 44.7 | — |
| Chemical liquid (Ve) | Phosphorous acid | 8000 | 31.9 | — |
| Chemical liquid (IVe) | Tetrazolyloxime component + Phosphorous acid | 200 + 8000 | 64.9 | 71.8 |

As shown in Table 8, the chemical liquid (IIIe) produces a synergistic effect on the preventive value of grass bacterial brown stripe.

A harmful effect of the chemical was not observed, either.

The same results were shown also when a phosphite salt (technical product of potassium phosphite) was used instead of the phosphite salt preparation.

COMPARATIVE EXAMPLE 4

A granular wettable powder containing 20.0% of a tetrazolyloxime component (t-butyl (6-{[(Z)-(1-methyl-1H-5-tetrazolyl)(phenyl)methylene]aminooxymethyl}-2-pyridyl)carbamate) (chemical 4) was provided.

A colorless and transparent liquid containing phosphorous acid (chemical 3) was provided.

The chemical 4 was diluted with water to obtain chemical liquid containing 200 ppm of the tetrazolyloxime component (Ie). The chemical 3 was diluted with water to obtain chemical liquid containing 8000 ppm of phosphorous acid (Ve).

The chemical 4 and the chemical 3 were mixed, and the mixture was diluted with water to obtain chemical liquid containing 200 ppm of the tetrazolyloxime component and 8000 ppm of phosphorous acid (IVe).

A grass bacterial brown stripe (*Acidovorax avenae*) test was performed by the same method as in Example 5 except that the chemical liquid (Ve) was used instead of the chemical liquid (IIe), and the chemical liquid (IVe) was used instead of the chemical liquid (IIIe). Table 8 shows the results. In the case of the combination of the tetrazolyloxime component and phosphorous acid, a synergistic effect was not observed.

The tetrazolyloxime component and the phosphite salt are combined to obtain the agricultural and horticultural composition that is not obtained by combining the tetrazolyloxime component and phosphorous acid, and is excellent in the effect of controlling plant disease or accelerating plant growth and the method for controlling plant disease or accelerating plant growth.

The invention claimed is:

1. An agricultural and horticultural composition effective at controlling plant disease or accelerating plant growth, comprising:
    a) t-butyl (6-{[(Z)-(1-methyl-1H-5-tetrazolyl) (phenyl) methylene]aminooxymethyl}-2-pyridyl) carbamate; and
    b) a phosphite salt,
wherein a mass ratio of the phosphite salt to t-butyl (6-{[(Z)-(1-methyl-1H-5-tetrazolyl) (phenyl)methylene]aminooxymethyl}-2-pyridyl) carbamate is 1/1000 to 1000/1 in terms of $P_2O_5$,
wherein a) and b) together yield greater effect than additive effect.

2. The agricultural and horticultural composition according to claim 1, wherein the phosphite salt is at least one selected from the group consisting of potassium phosphite, ammonium phosphite, calcium phosphite, aluminum phosphite, and sodium phosphite.

3. The agricultural and horticultural composition according to claim 1, wherein a content of the phosphite salt is 0.1 to 70% by mass in terms of $P_2O_5$.

4. The agricultural and horticultural composition according to claim 1, further comprising at least one selected from the group consisting of a fungicide, an insecticide, a miticide, a nematicide, a soil pesticide, an insect repellent, a herbicide, a plant growth regulator, and a fertilizer.

5. The agricultural and horticultural composition according to claim 1, further comprising a nitrogen component.

6. The agricultural and horticultural composition according to claim 1, further comprising a potassium component.

7. The agricultural and horticultural composition according to claim 1, further comprising a component containing an element selected from the group consisting of boron, molybdenum, sulfur, and manganese.

8. The agricultural and horticultural composition according to claim 1, wherein a mass ratio of the phosphite salt to t-butyl (6-{[(Z)-(1-methyl-1H-5-tetrazolyl)(phenyl)methylene]aminooxymethyl}-2-pyridyl) carbamate is 1/100 to 100/1 in terms of $P_2O_5$.

9. The agricultural and horticultural composition according to claim 1, wherein a mass ratio of the phosphite salt to t-butyl (6-{[(Z)-(1-methyl-1H-5-tetrazolyl)(phenyl)methylene]aminooxymethyl}-2-pyridyl) carbamate is 1/1 to 1/100 in terms of $P_2O_5$.

10. The agricultural and horticultural composition according to claim 1, wherein a mass ratio of the phosphite salt to t-butyl (6-{[(Z)-(1-methyl-1H-5-tetrazolyl)(phenyl)methylene]aminooxymethyl}-2-pyridyl) carbamate is 1/5 to 1/50 in terms of $P_2O_5$.

11. A method for controlling plant disease or accelerating plant growth, comprising simultaneously or successively applying
    a) t-butyl (6-{[(Z)-(1-methyl-1H-5-tetrazolyl) (phenyl) methylene]aminooxymethyl}-2-pyridyl)carbamate and
    b) a phosphite salt to a plant, soil, or hydroponic plowland,
    wherein a mass ratio of the phosphite salt to t-butyl (6-{[(Z)-(1-methyl-1H-5-tetrazolyl)(phenyl)methylene]aminooxymethyl}-2-pyridyl) carbamate is 1/1000 to 1000/1 in terms of $P_2O_5$,
    wherein a) and b) together yield greater effect than additive effect.

12. The method according to claim 11, wherein the phosphite salt is at least one selected from the group consisting of potassium phosphite, ammonium phosphite, calcium phosphite, aluminum phosphite, and sodium phosphite.

13. A method for controlling plant disease or accelerating plant growth, comprising applying the agricultural and horticultural composition according to claim 1 to a plant, soil, or hydroponic plowland.

14. The method according to claim 11, wherein a mass ratio of the phosphite salt to t-butyl (6-{[(Z)-(1-methyl-1H-5-tetrazolyl)(phenyl)methylene]aminooxymethyl}-2-pyridyl) carbamate is 1/100 to 100/1 in terms of $P_2O_5$.

15. The method according to claim 11, wherein a mass ratio of the phosphite salt to t-butyl (6-{[(Z)-(1-methyl-1H-5-tetrazolyl)(phenyl)methylene]aminooxymethyl}-2-pyridyl) carbamate is 1/1 to 1/100 in terms of $P_2O_5$.

16. The method according to claim 11, wherein a mass ratio of the phosphite salt to t-butyl (6-{[(Z)-(1-methyl-1H-5-tetrazolyl)(phenyl)methylene]aminooxymethyl}-2-pyridyl) carbamate is 1/5 to 1/50 in terms of $P_2O_5$.

* * * * *